(12) United States Patent
Karonis, III

(10) Patent No.: US 8,965,404 B2
(45) Date of Patent: Feb. 24, 2015

(54) PROVIDING LOCATION OF A MOBILE DEVICE

(75) Inventor: George Peter Karonis, III, Castaic, CA (US)

(73) Assignee: Liveviewgps, Inc., Valencia, CA (US)

( * ) Notice: Subject to any disclaimer, the term of this patent is extended or adjusted under 35 U.S.C. 154(b) by 391 days.

(21) Appl. No.: 13/473,423

(22) Filed: May 16, 2012

(65) Prior Publication Data

US 2013/0309997 A1    Nov. 21, 2013

(51) Int. Cl.
*H04W 24/00*    (2009.01)

(52) U.S. Cl.
USPC .............. 455/456.2; 455/405; 455/456.1; 455/457

(58) Field of Classification Search
CPC ....... H04W 4/02; H04W 4/023; H04W 4/025; H04W 4/24; H04W 4/26; H04M 3/248; H04M 15/68; H04M 15/71; H04M 15/715; H04M 15/72; H04M 15/721; H04M 15/723; H04M 17/00; H04M 17/005; H04M 17/20; H04M 17/30; H04M 17/301
USPC ........ 455/404.1, 404.2, 456.1–457, 405–408; 340/539.13, 988–996
See application file for complete search history.

(56) References Cited

U.S. PATENT DOCUMENTS

| | | | |
|---|---|---|---|
| 5,742,509 A | 4/1998 | Goldberg et al. | |
| 7,853,268 B2 | 12/2010 | Karaoguz et al. | |
| 7,864,047 B2 | 1/2011 | Aninye et al. | |
| 8,036,707 B2 | 10/2011 | Kumar | |
| 2003/0134648 A1 | 7/2003 | Reed et al. | |
| 2003/0148775 A1 | 8/2003 | Spriestersbach et al. | |
| 2005/0037729 A1 | 2/2005 | Dupont et al. | |
| 2006/0121917 A1* | 6/2006 | Shin | 455/456.5 |
| 2006/0170588 A1 | 8/2006 | Chang | |
| 2007/0229350 A1* | 10/2007 | Scalisi et al. | 342/350 |
| 2009/0081989 A1* | 3/2009 | Wuhrer | 455/406 |
| 2010/0022255 A1 | 1/2010 | Singhal | |
| 2010/0283600 A1 | 11/2010 | Herbert et al. | |
| 2010/0330955 A1* | 12/2010 | Chan et al. | 455/406 |
| 2011/0282567 A1* | 11/2011 | Nortrup | 701/118 |
| 2012/0149325 A1* | 6/2012 | Titus et al. | 455/404.2 |
| 2012/0239452 A1* | 9/2012 | Trivedi et al. | 705/7.22 |
| 2012/0289207 A1* | 11/2012 | Cloutier et al. | 455/414.1 |

FOREIGN PATENT DOCUMENTS

JP    2010067169 A    9/2008

* cited by examiner

*Primary Examiner* — Ronald Eisner
(74) *Attorney, Agent, or Firm* — Douglas L. Weller

(57) ABSTRACT

A computer server provides location of a mobile device to a user. The computer server allocates to an account for the user a predetermined number of location credits associated with a purchase made by the user; The computer server receives, from the user, identification information that identifies the mobile device. Upon the user requesting a current location of the mobile device, the computer server checks to see whether there remains location credits allocated to the account for the user and, provided there remains location credits allocated to the account for the user, provides to the user location information about the current location of the mobile device.

20 Claims, 4 Drawing Sheets

PROVIDING LOCATION OF A MOBILE DEVICE

BACKGROUND

The global positioning satellite (GPS) capability of cells phones provides the opportunity to monitor location of cell phones. Services like instamapper service, available at http://www.instamapper.com/, allows a GPS-enabled cell phone to be tracked online in real time.

It is not necessary for a cell phone to have GPS capability to be monitored. Location of cell phones can also be estimated using "cell tower triangulation." In this method, a ping can be sent from each cell tower currently detecting the signal of a cell phone. The distance of the cell phone to a cell tower can be estimated based on the lag time between the time when the cell tower sends a ping to the cell phone and a time when the cell tower receives an answering ping back from the cell phone.

Assuming a relatively flat topography, If there are at least three cell towers within range of a cell phone, and the distance between the cell and each of the three towers is known (at least approximately) from estimates based on ping lag time, then it is possible to calculate (or at least estimate) a location of the cell phone based on the location of the three cell towers.

DETAILED DESCRIPTION

Figure 1:
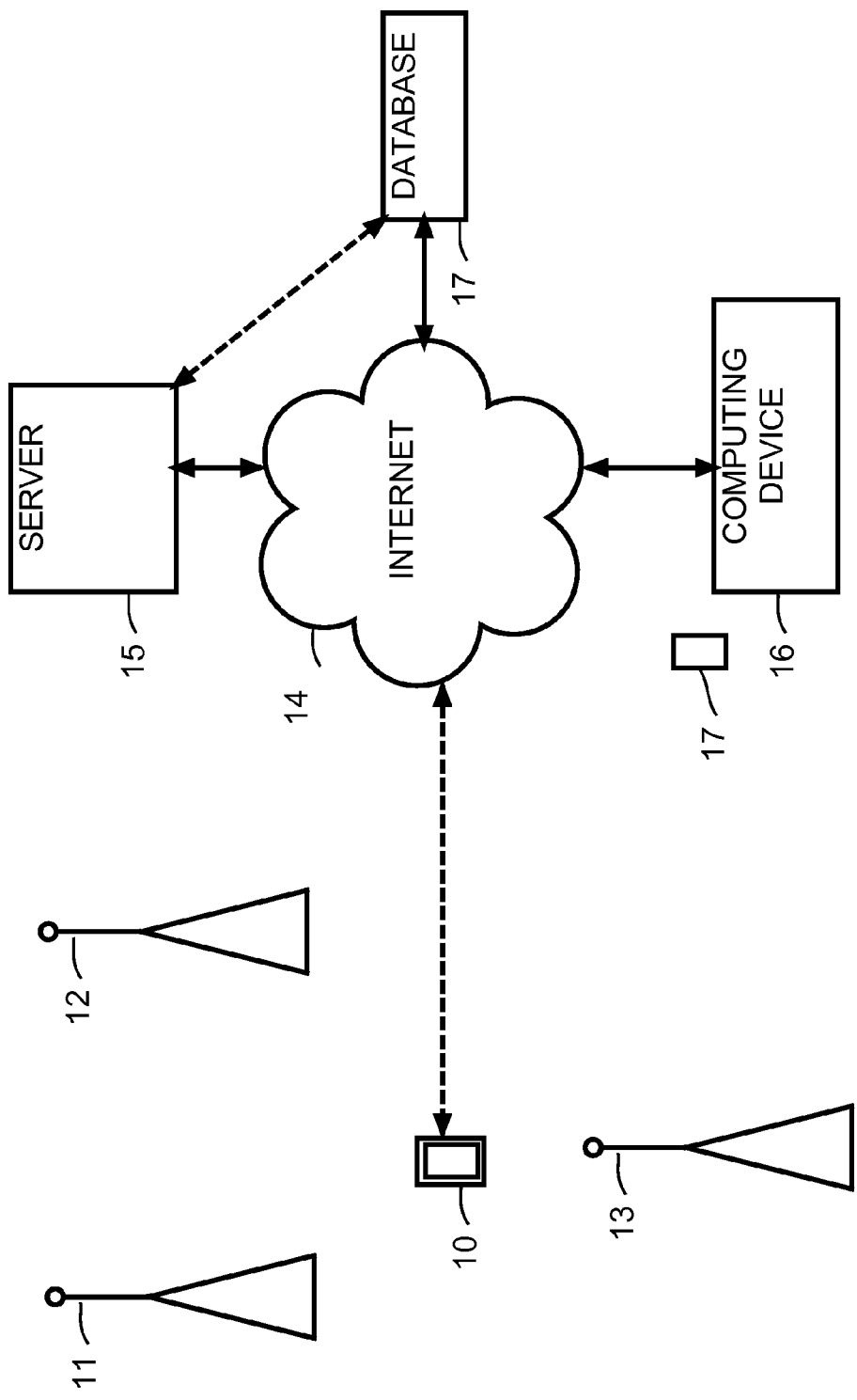
FIG. 1 is a simplified block diagram showing a system in which a prepaid card is used to provide location credits used to obtain location of a cell phone in accordance with an implementation.

FIG. 1 shows a cell phone 10 in communication with a cell tower 11, a cell tower 12 and a cell tower 13. A location of cell phone 10 can be estimated using cell tower triangulation. That is cell tower 11 can send a ping to cell phone 10. The distance from cell tower 11 to cell phone 10 can be estimated based on the lag time between a time when cell tower 11 sends a ping to cell phone 10 and a time when cell tower 11 receives back an answering ping from cell phone 10. Likewise, the distance from cell tower 12 to cell phone 10 can be estimated based on the lag time between a time when cell tower 12 sends a ping to cell phone 10 and a time when cell tower 12 receives back an answering ping from cell phone 10. Also, the distance from cell tower 13 to cell phone 10 can be estimated based on the lag time between a time when cell tower 13 sends a ping to cell phone 10 and a time when cell tower 13 receives back an answering ping from cell phone 10.

Geographic location of cell phone 10 can be estimated in other ways. For example, if cell phone 10 is GPS enabled, cell phone 10 can determine its location based on triangulation based on GPS signals. Particularly, distance to a satellite can be based on measuring how long a radio signal takes to travel from the satellite to cell phone 10. Knowing cell phone distance from three satellites is usually sufficient to locate a cell phone because one of the two points identified by the triangulation will be on the surface of the earth, and thus be a better guess for the location of the cell phone. Knowing cell phone distance from four satellites will allow a unique three-dimensional location of cell phone 10 to be identified.

Location information of cell phone 10 can be obtained by server 15. For example, a cell phone company can provide this location based on cell phone triangulation. Alternatively, cell phone 10 can provide this information to server 15 based on its estimate of its location based on GPS. For example cell phone 10 communicates location information to server 15 via a connection through internet 14.

If a user utilizing a computing device 16 desires to monitor location of cell phone 10, computer device 16 can, via internet 14, request this information from server 15. Computer device 16 is, for example, a personal computer, a portable computer, a tablet device, a reader with a web browser, a smart phone, a personal digital assistant, or some other device capable of communicating with server 15 through internet 14.

Server 15 may, for example, provide the requested location information to computing device 16 for a service charge. For example, the user of computing device 16 can purchase a prepaid card that pays for a predetermined number of location checks for cell phone 10. Server 15 stores prepaid information in a database 17. Database 17 may be accessed by server 15 via internet 14 or through some other communication means. Alternatively, server 15 may host database 17 within server 15.

Figure 2:
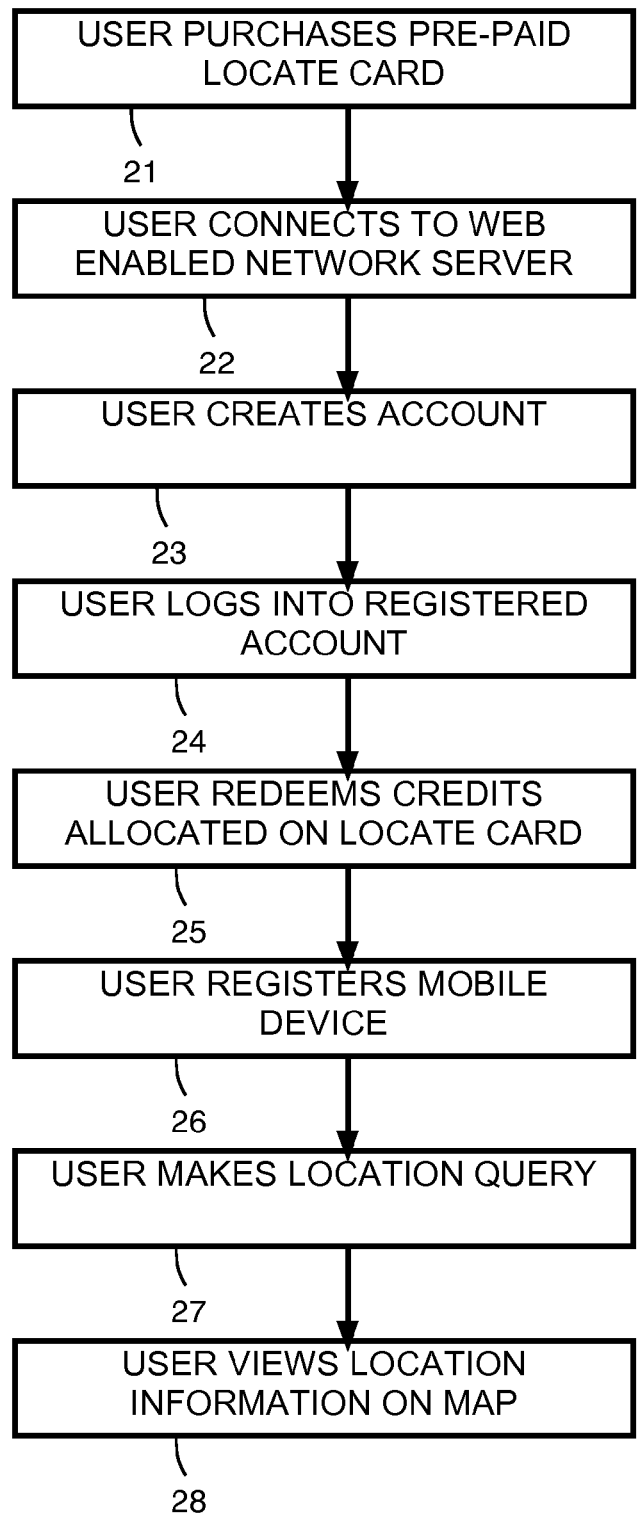
FIG. 2 is a simplified flow chart that illustrates a user view of a system in which a prepaid card is used to provide location credits used to obtain location of a cell phone in accordance with an implementation.

FIG. 2 is a simplified flow chart that illustrates a user view of a system in which a prepaid card is used to provide location credits used to obtain location of a cell phone. In a block 21, a user purchases a prepaid locate card. For example, the user can purchase the prepaid card at a "brick and mortar store" such as an electronics store, a computer store, a cell phone store, a grocery store or a drug store, etc. Alternatively, the user can purchase the prepaid locate card through an internet merchant or a catalog merchant, etc.

The prepaid card may be, for example, a physical card where a sticker or scratch-off surface conceals a registration code. Alternatively, the prepaid card may not be a physical card, but may merely be a registration code transmitted to a user upon the user's purchase of the prepaid card, for example, via an internet merchant.

In a block 22, a user connects to server 15 via internet 14 utilizing, for example cell phone 10, computing device 16 or some other device with capability to connect to server 15. In a block 23, the user creates an account. Information for the account, for example, may be stored by server 15 in database 17.

In a block 24, the user logs into the registered account. While logged in, the user can redeem location credits allocated on the purchased prepaid card, as shown in a block 25. For example, the user provides the registration code from the prepaid to server 15. Server 15 consults database 17 to determine whether the registration code is valid and not yet used. If the registration code is valid and not yet used, server 15 then determines the number of location credits associated with the registration code. Then, server 15 accesses database 17 to add the number of location credits associated with the registration code to the user's account and to mark the registration code as used. Alternatively, or in addition, the user can purchase location credits when logged in, for example using a credit card, a debit card, or some other purchasing method.

In a block 26, performed before or after a user redeems location credits, the user registers a mobile device whose location is to be tracked. For example, the mobile device is a cell phone such as cell phone 10. For example, the user registers a cell phone by providing a telephone number for the cell phone.

In a block 27, the user makes a location query. For example, the user makes a location query from computing device 16, cell phone 10, or any other device that is able to access server 15. After the user is logged into the account the user request location of cell phone 10. Server 15 accesses location information, for example as generated by triangulation from information from cell towers nearby cell phone 10. Provided there is at least one location credit available in the user's account for cell phone 10, the server provides the user with the location information for cell phone 10. For example, if the user has logged onto server 15 through use of computing device 16, server 15 will display the location information on a map provided to computing device 16. Similarly, server 15 will cause the location information to be displayed on a map of any device from which the user requests the location information.

Figure 4:
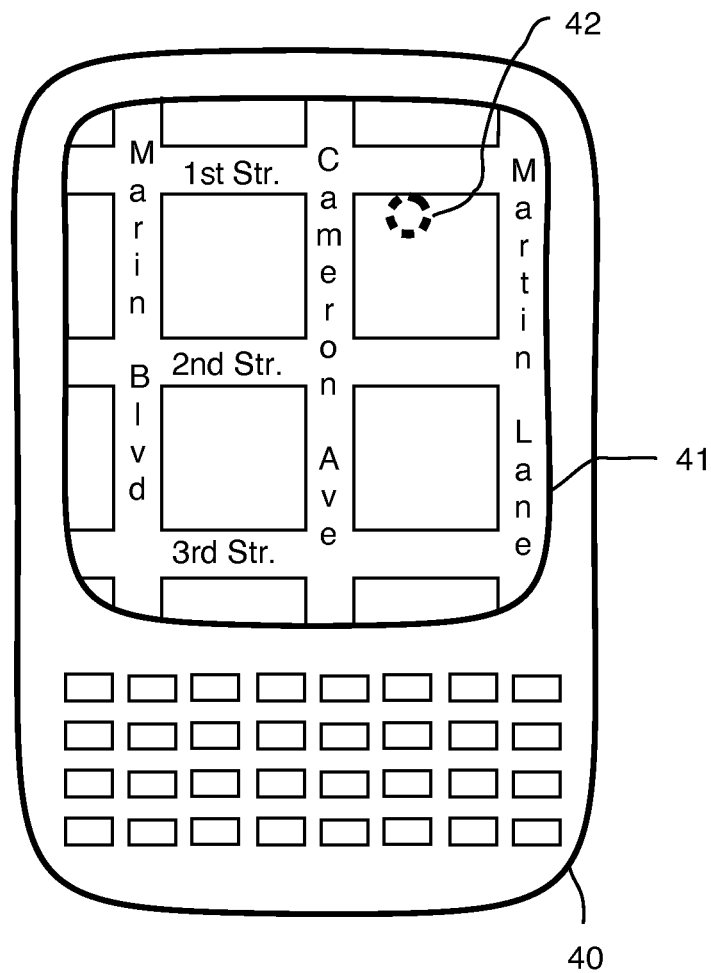
FIG. 4 is shows a location of a cell phone displayed on a map in response to use of a location credit within a system in which a prepaid card is used to provide location credits used to obtain location of the cell phone in accordance with an implementation.

For example, FIG. 4 shows a location 42 for cell phone 10 being displayed on a display 41 of a smart phone 40. The display is the result of the user using smart phone 40 to log into server 15 and to request location information for cell phone 10.

Figure 3:
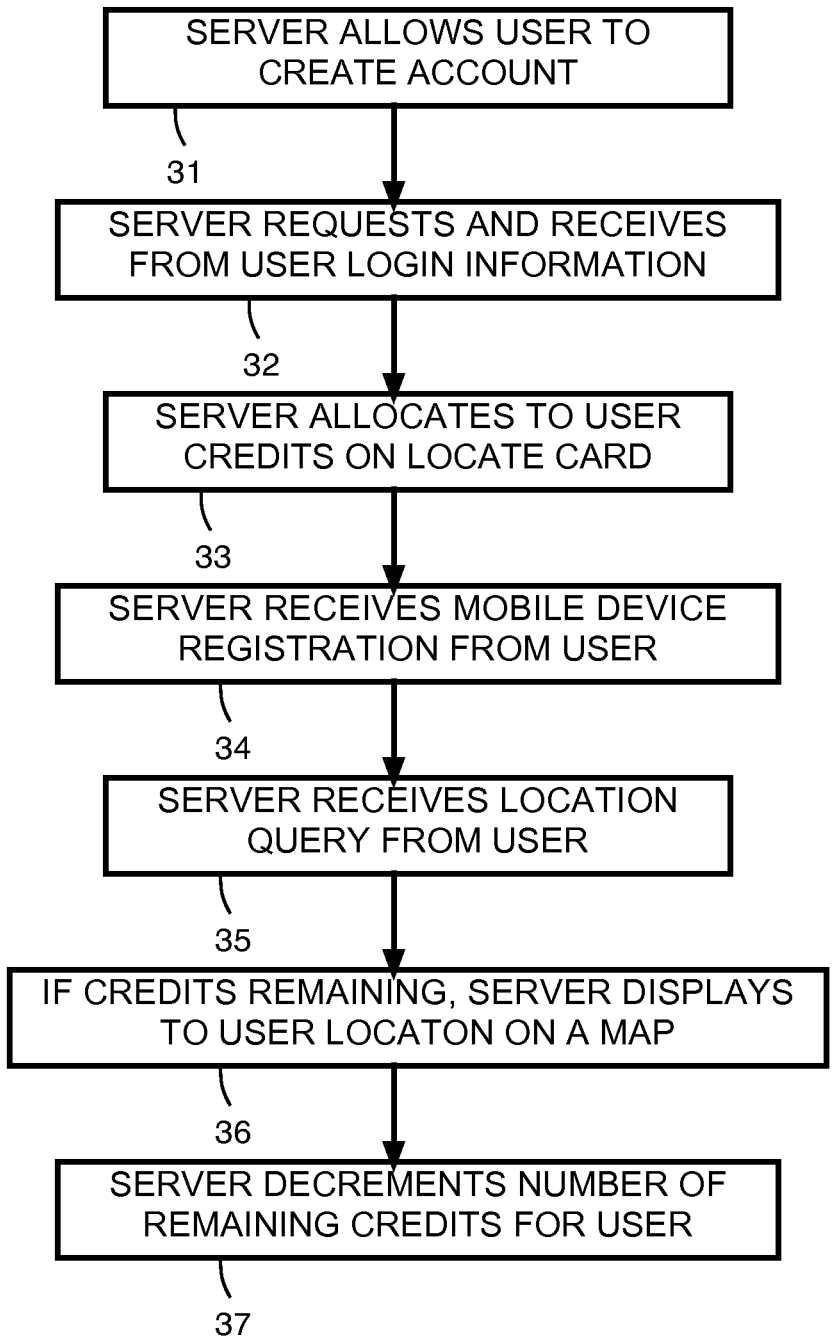
FIG. 3 is a simplified flow chart that illustrates a server perspective of a system in which a prepaid card is used to provide location credits used to obtain location of a cell phone in accordance with an implementation.

FIG. 3 is a simplified flow chart that illustrates a server perspective of a system in which a prepaid card is used to provide location credits used to obtain location of a cell phone. In a block 31, upon a user connecting to server 15 via internet 14, the server allows the user to create an account.

In a block 32, the server requests and receives login information from the user when the user attempts to log into the registered account. While the user is logged in, server 15 allows the user to redeem location credits allocated on the purchased prepaid card, as illustrated by block 33. Server 15 consults database 17 to determine whether the registration code is valid and not yet used. If the registration code is valid and not yet used, server 15 determines the number of location credits associated with the registration code. Then, server 15 accesses database 17 to add the number of location credits associated with the registration code to the user's account and to mark the registration code as used. Alternatively, or in addition, server 15 allows the user to purchase location credits when logged in, for example, using a credit card, a debit card, or some other purchasing method.

In a block 34, server 15 receives the mobile device registration from the user. Server 15 updates database 17 with identification of the mobile device for the user's account.

Once a user is registered and location credits are allocated to a registered mobile device, such as cell phone 10, the server is ready to receive location requests from the user. In a block 35, server 15 receives a location query from the user, for example via the user logging onto server 15 and making the request from computing device 16, cell phone 10, or any other device that is able to access server 15. In a block 36, server 15 checks the user account to see if there are location credits remaining. If not, the location request is refused. If there are location credit locations remaining, then server 15 accesses location information, for example as generated by triangulation from information from cell towers nearby cell phone 10. For example, server 15 will caused to be displayed the location information on a map provided to computing device 16 or some other device from which the user requests the location information. In a block 37, server 15 decrements the number of remaining location credits in the user account.

The foregoing discussion discloses and describes merely exemplary methods and implementations. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

I claim:

1. A method, performed by a computer server, for providing location of a mobile device, comprising:
receiving, at the server, from a user a registration code obtained by the user from a prepaid card, each location credit authorizing one user request for a current location of the mobile device;
verifying, by the server, whether the registration code is valid and has not been previously used; and
upon determining that the registration code is valid and has not been previously used, allocating, by the server, to an account for the user a predetermined number of location credits associated with the registration code from the prepaid card, and marking the registration code as used;
allowing, by the server, the user to log in to the account, and receiving at the server, from the user who is logged into the account, identification information that identifies the mobile device; and,
associating, by the server, the identification information of the mobile device with the account;
upon the user who is logged into the account requesting a current location of the mobile device, performing, by the server, the following:
checking to see whether there remains location credits allocated to the account for the user, and
if there remain no location credits allocated to the account for the user, refusing the location request, and
provided there remains location credits allocated to the account for the user, providing to the user location information about the current location of the mobile device, and decrementing by one the location credits allocated to the account for the user.

2. A method as in claim 1 wherein the registration code is obtained from the prepaid card via removing a scratch off surface or a sticker.

3. A method as in claim 1 wherein before allocating the predetermined number of location credits associated with the registration code from the prepaid card, the computer server checks in a non-transitory database to determine whether the registration code is valid.

4. A method as in claim 1 wherein the mobile device is a cell phone and the identification information is a phone number.

5. A method as in claim 1 wherein before receiving the registration code from the user, the server allows the user to log in to the server.

6. A method as in claim 1 wherein the server provides the location information to the user by displaying on a map a current location for the mobile device.

7. A method as in claim 1 wherein the current location of the mobile device is obtained using cell tower triangulation.

8. A system used for tracking a mobile device, the system comprising:
a non-transitory database on which is stored account information; and,
a server enabled to:
receive from a user a registration code obtained by the user from a prepaid card, each location credit authorizing one user request for a current location of the mobile device;

verify whether the registration code is valid and has not been previously used; and allocate, upon determining that the registration code is valid and has not been previously used, to an account for the user a predetermined number of location credits associated with the registration code from the prepaid card, and mark the registration code as used;

allow the user to log in to the account; and receive, from the user who is logged into the account, identification information that identifies the mobile device, and associate the identification information of the mobile device with the account;

upon the user who is logged into the account requesting a current location of the mobile device, perform the following:

check to see whether there remains location credits allocated to the account for the user, and refuse the location request, if there remain no location credits allocated to the account for the user, and provided there remains location credits allocated to the account for the user, provide to the user location information about the current location of the mobile device when the user requests a current location of the mobile device and there remains location credits allocated to the account for the user, and decrement by one the location credits allocated to the account for the user.

9. A system as in claim 8 wherein the server is additionally enabled to decrement by one the location credits allocated to the account for the user after is provided location information about the current location of the mobile device.

10. A system as in claim 8 wherein the registration code is obtained from the prepaid card via removing a scratch off surface or a sticker.

11. A system as in claim 8 wherein before allocating the predetermined number of location credits associated with the registration code from the prepaid card, the server checks in the non-transitory database to determine whether the registration code is valid.

12. A system as in claim 8 wherein the mobile device is a cell phone and the identification information is a phone number.

13. A system as in claim 8 wherein before receiving the registration code from the user, the server allows the user to log in to the server.

14. A system as in claim 8 wherein the server provides the location information to the user by displaying on a map a current location for the mobile device.

15. A system as in claim 8 wherein the current location of the mobile device is obtained using cell tower triangulation.

16. A method, performed by a computer server, for providing location of a mobile device, comprising:

receiving from a user a registration code obtained by the user from a prepaid card, each location credit authorizing one user request for a current location of the mobile device;

verifying whether the registration code is valid and has not been previously used; and upon determining that the registration code is valid and has not been previously used, allocating to an account for the user a predetermined number of location credits associated with the registration code from the prepaid card, and marking the registration code as used;

allowing the user to log in to the account, and receiving, from the user who is logged into the account, identification information that identifies the mobile device; and, associating the identification information of the mobile device with the account;

upon the user who is logged into the account requesting a current location of the mobile device, performing the following:

checking to see whether there remains location credits allocated to the account for the user, and if there remain no location credits allocated to the account for the user, refusing the location request, and provided there remains location credits allocated to the account for the user, providing to the user location information about the current location of the mobile device, and decrementing by one the location credits allocated to the account for the user.

17. A method as in claim 16 wherein when the computer server provides to the user location information about the current location of the mobile device the computer server also decrements by one the location credits allocated to the account for the user.

18. A method as in claim 17 wherein the mobile device is a cell phone and the identification information is a phone number.

19. A method as in claim 17 wherein the server provides the location information to the user by displaying on a map a current location for the mobile device.

20. A method as in claim 17 wherein the current location of the mobile device is obtained using cell tower triangulation.

* * * * *